United States Patent [19]
Chiba

[11] Patent Number: 6,043,964
[45] Date of Patent: Mar. 28, 2000

[54] CARTRIDGE FOR A RECORDING MEDIUM HAVING COVER BEARING ELEMENTS THAT PREVENT DUST FROM ENTERING THE CARTRIDGE

[75] Inventor: Sachiya Chiba, Miyagi, Japan

[73] Assignee: Sony Corporation, Tokyo, Japan

[21] Appl. No.: 09/025,431

[22] Filed: Feb. 18, 1998

[30] Foreign Application Priority Data

Feb. 24, 1997 [JP] Japan ................................... 9-039503

[51] Int. Cl.[7] .......................... G11B 23/03; G11B 23/02; G11B 7/26
[52] U.S. Cl. .......................... 360/133; 360/132; 369/291
[58] Field of Search .................... 360/132, 133; 369/291; 242/347.1, 347.2

[56] References Cited

U.S. PATENT DOCUMENTS

| | | | |
|---|---|---|---|
| 4,933,796 | 6/1990 | Tanaka | 360/132 |
| 4,945,440 | 7/1990 | Iwahashi et al. | 360/132 |

*Primary Examiner*—David Davis
*Attorney, Agent, or Firm*—Jay H. Maioli

[57] ABSTRACT

A cartridge device for a recording medium in which the effect of dust generated in a bearing portion between a cartridge main body portion and a lid member is suppressed for maintaining reliability even on prolonged use. A housing section 15 for a recording medium 1 formed in a cartridge main body portion 11 and a supporting void 17 for supporting a lid member 12 adapted for opening or closing a recording/reproducing aperture 16 are formed as voids separated from each other by a partitioning wall section 19. On the inner peripheral wall section in the supporting void 17 are formed an annular projection 22 and annular recesses 23 in continuation to one another. The lid member 12 is formed with supporting shafts 28 on the outer peripheral surface of which annular projections are formed in continuation to one another. The facing annular projections and annular recesses 23 are combined with one another, while other facing annular projections 23 and annular recesses 31 are combined with one another to form a radial step in the axial opening hole. The bearing void 17 and the supporting shafts 28 are supported inwardly of the step for preventing dust from flying to outside.

9 Claims, 10 Drawing Sheets

$J > D + (E-L)$

CARTRIDGE FOR A RECORDING MEDIUM HAVING COVER BEARING ELEMENTS THAT PREVENT DUST FROM ENTERING THE CARTRIDGE

BACKGROUND OF THE INVENTION

1. Field of the invention

This invention relates to a cartridge device for a recording medium holding a recording medium including a disc-shaped recording medium, such as a magnetic disc, a magneto-optical disc or a floppy disc, or a magnetic tape, in its main cartridge body portion. More particularly, it relates to a cartridge device for a recording medium having a cover member, such as a lid member or a shutter member, for opening or closing a recording/reproducing aperture provided in the main cartridge body portion.

2. Description of the Related Art

In a cartridge device for a recording medium, holding a recording medium, including a disc-shaped recording medium, such as a magnetic disc or a magneto-optical disc, or a magnetic tape, in its main cartridge body portion, usually a recording/reproducing aperture is formed in the main cartridge body portion in order to permit the magnetic head or the like to be intruded into the inside the cartridge device, while a lid member as a shutter member for opening or closing this recording/reproducing aperture is assembled in position. By this shutter member and the lid member, the cartridge device for a recording medium prevents dust and dirt or foreign matter from entering the interior of the cartridge main body via recording/reproducing aperture to become attached to and damage the recording medium to lower recording characteristics.

Referring to FIGS. 1 and 2, a magnetic disc cartridge device 50 has a cartridge main body portion 51 which is combined from an upper half 52 and a lower half 53 each formed in the shape of a rectangular shallow saucer. In the cartridge main body portion 51 is rotatably housed a magnetic disc 1.

Referring to FIG. 2, arcuate-shaped guide wall sections 54 are formed upright on the facing inner sides of the upper half 52 and the lower half 53. When assembled together, these guide wall sections 54 are abutted to each other to define a disc housing 55 in which to rotatably hold a magnetic disc 1. The lower half 53 is formed with a hub opening 53a mounted at a mid portion of the disc housing 55 to cause the center hub 2 of the magnetic disc 1 to be exposed to outside.

The cartridge main body portion 51 has its front side opened for defining a recording/reproducing aperture 56 to permit entrance of the magnetic head on the side of the recording/reproducing apparatus. On this cartridge main body portion 51 is mounted a lid member 57 for opening/closing the recording/reproducing aperture 56. The lid member 57 is formed as a substantially rectangular form by having a horizontally elongated major surface section 57a of an outer size sufficient to close the recording/reproducing aperture 56 and lateral surface sections 57b, 57c integrally formed with both lateral sides of the major surface section 57a at right angles therewith. This lid member 57 has on the inner surfaces of the lateral surface sections 57b, 57c integral co-linear supporting shafts 58a, 58b.

The lid member 57 is rotatably assembled on the cartridge main body portion 51 by having supporting shafts 58a, 58b fitted in axial holes formed by combining U-shaped recesses formed on the abutting upper edges of both lateral side sections of the upper half 52 and the lower half 53. The lid member 57 usually closes the recording/reproducing aperture 56 under the force of a torsion spring, not shown. If the magnetic disc cartridge device 50 is loaded on the recording/reproducing apparatus, the lid member 57 is rotated by an opening member, not shown, against the force of the torsion spring for opening the recording/reproducing aperture 56.

Into the magnetic disc cartridge device 50 is intruded a magnetic head device on the side of the recording/reproducing apparatus via the opened recording/reproducing aperture 56 so as to face the major surface of the magnetic disc housed therein. In the magnetic disc cartridge device 50, the magnetic head device records or reproduces information signals recorded on the magnetic head device.

In a tape cartridge device 60, used in a video tape recorder or audio tape recorder, an upper half 62 and a lower half 63, each formed in the form of a rectangular shallow saucer, are assembled together to form a cartridge main body portion 61. In the inside of the cartridge main body portion 61 are rotatably housed a pair of tape reels 3a, 3b. In the tape cartridge device 60, a magnetic tape 4 is reeled out from the tape reel 3a to run on the front surface of the cartridge main body portion 61 so as to be taken up on the opposite side tape reel.

The cartridge main body portion 61 is formed with a recording/reproducing aperture 65 by providing an opening in its front surface along which runs the magnetic tape 4. A lid assembly 64 is rotatably mounted on the cartridge main body portion 61 for opening/closing this recording/reproducing aperture 65. The lid assembly 64 is made up of a front side lid and a rear lid, not shown in detail, for defining a running space for the magnetic tape 4. Referring to FIG. 3, the lid assembly 64 usually closes the recording/reproducing aperture 65 under the force of a torsion spring, not shown. When the tape cartridge device 60 is loaded on the recording/reproducing apparatus, the lid assembly 64 is rotated by an opening member against the force of a torsion spring for opening the recording/reproducing aperture 65.

Into the tape cartridge device 60 is intruded a magnetic head device on the side of the recording/reproducing apparatus from the opened recording/reproducing aperture 60 so as to have a sliding contact with the magnetic tape 4 running on the front surface of the cartridge main body portion 61. In the tape cartridge device 60, the information signals are recorded or reproduced by the magnetic head device.

In a disc cartridge device 70, holding a magneto-optical disc 5, an upper shell 72 and a lower shell 73, each in the shape of a rectangular shallow saucer, are combined to form a cartridge main body portion 71, as shown in FIG. 4. The cartridge main body portion 71 is formed with a hub opening 73a for causing a center hub 6 of the magneto-optical disc 5 to face to outside, while a recording/reproducing aperture 74 is formed in the major surfaces of the upper shell 72 and the lower shell 73.

The recording/reproducing apparatus 74 is a rectangular opening for causing portions of the front and rear surfaces of the magneto-optical disc 5 radially to be exposed to outside. For example, an optical pickup of the recording/reproducing apparatus is intruded from the upper shell 72, while a magnetic head device is intruded from the lower shell 73 for facing the major surface of the magneto-optical disc 5. The recording/reproducing aperture 74 is usually closed by a shutter member 75 slidably assembled on the cartridge main body portion 71.

Although not shown, the shutter member 75 is formed substantially in a U-shape by having front and back side shutter portions large enough to open or close the recording/ reproducing aperture 74 and a connecting portion interconnecting these shutter portions. In the shutter member, the shutter portions are positioned in slide guide recesses 76 formed in the major surfaces of the upper shell 72 and the lower shell 73, whilst the connecting portion is extended along the front side of the cartridge main body portion 71. A driving piece 77 engaged in a guide recess formed in the front surface of the cartridge main body portion 71 is mounted on the shutter member 75. This shutter member 75 is combined with the cartridge main body portion 71 for usually closing the recording/reproducing aperture 74 under the force of a spring, not shown. The shutter member 75, now provided, is configured for maintaining the recording/reproducing aperture in the closed state by a mechanical lock mechanism, not shown.

When the disc cartridge device 70 is loaded on the recording/reproducing apparatus, the driving piece 77 is moved along the guide recess against the force of the spring for sliding the shutter member 75 in the slide guide recess 76. This opens the recording/reproducing aperture 74 of the disc cartridge device 70 so that the optical pickup device and the magnetic head device on the side of the recording/reproducing apparatus are positioned for facing the front and back sides, respectively, of the magneto-optical disc 5 via the opened recording/reproducing aperture 74.

In the disc cartridge device 70, information signals recorded on the magneto-optical disc 5 are reproduced by an optical pickup device. Also, in the disc cartridge device 70, information signals are recorded on the magneto-optical disc 5 by the optical pickup device and the magnetic head device.

In the above-described conventional cartridge device for a recording medium, a recording/reproducing aperture is formed in the cartridge main body portion, while there is mounted the cover member, such as the lid member or the shutter member, for opening/closing the recording/reproducing aperture. The cover member operates for preventing dust and dirt or foreign matter from being intruded into the inside of the cartridge main body portion via the recording/reproducing aperture as described above. However, in the conventional cartridge device for a recording medium, since the cover member is in frictional sliding contact with the major surface of the cartridge main body during its operation, there is generated cutting dust which is intruded into the inside of the cartridge main body so as to be affixed to the recording surface of the recording medium to affect the recording/reproducing characteristics.

That is, in the magnetic disc cartridge device 50, shown in FIGS. 1 and 2, the lid member 57 is rotatably combined with the cartridge main body portion 51 by supporting shafts 58a, 58b on fulcrum portions 57b, 57c being fitted in axial holes in the cartridge main body portion 51. In the magnetic disc cartridge device 50, an axial hole in the cartridge main body portion 51 is passed through lateral surface sections of the upper half 52 and the lower half 53 so as to directly face a disc housing section 55, as shown in FIG. 2. In the magnetic disc cartridge device 50, the inner wall of the axial hole is rubbed against the outer rim portions of the supporting shafts 58a, 58b to produce dust on opening/closing the lid member 57.

In the magnetic disc cartridge device 50, there are occasions wherein the generated dust is intruded into the inside of the cartridge main body portion 51 to become affixed to the surface of the magnetic disc held therein. In the magnetic disc cartridge device 50, the magnetic head device is intruded into a narrow space defined between the magnetic disc 1 of the cartridge main body portion 51 and the upper half 52, while the gap between the magnetic disc 1 and the magnetic head is as small as 0.05 $\mu$m. On the other hand, the generated dust is generally 1 to 20 $\mu$m.

Therefore, in the conventional magnetic disc cartridge device 50, the risk is high that serious accidents, such as recording/reproducing dropout of information signals or destruction of the magnetic head, may be produced due to the dust and dirt. This phenomenon becomes outstanding on prolonged use of the magnetic disc cartridge device 50 to affect the operating reliability.

Also, in the tape cartridge device 60, shown in FIG. 3, supporting shafts are integrally formed on both lateral sides of the lid structure 64, which is rotatably assembled on the cartridge main body portion 61 for rotatably assembling the lid structure 64 on the cartridge main body portion 61. Thus, on rotating the lid structure 64, the inner wall section of the axial hole is rubbed against the outer periphery of the supporting shaft for producing dust and dirt.

With the tape cartridge device 60, the produced dust is intruded into the inside of the cartridge main body portion 61 to become affixed to the surfaces of the magnetic tape 4 placed around tape reels 3a, 3b or to be intruded between neighboring layers. Moreover, the magnetic disc cartridge device 50 suffers from a drawback that the generated dust is also intruded into the recording/reproducing apparatus for affecting the magnetic head device or various other components. Thus, in the tape cartridge device 60, the magnetic tape 4 tends to be damaged by this dust or problems such as dropout of information signals or destruction of the magnetic head are raised. There is also raised such a problem that the generated dust be intruded into the recording/reproducing apparatus to affect the magnetic head device or other components.

In addition, in the disc cartridge device 70, shown in FIG. 4, since the shutter member 75 is slid in contact with the inside of a guide recess 76 to open/close the recording/reproducing aperture 74, the shutter member 75 is rubbed against the bottom surface of the slide guide recess 76 to produce dust and dirt. This dust and dirt is forwarded from the bottom surface of the slide guide recess 76 via the recording/reproducing aperture 74 into the inside of the cartridge main body portion 71, with movement of the shutter member 75, so as to become affixed to the major surface of the magneto-optical disc 5 held therein.

Thus, in the magnetic disc cartridge device 70, the risk is high that serious accidents, such as recording/reproducing dropout of information signals or destruction of the magnetic head, may be produced due to this dust. There is also raised such a problem that the generated dust be intruded into the recording/reproducing apparatus to affect the magnetic head device or other components.

For solving the above problem, it is contemplated in the above-described cartridge devices for recording mediums to charge a highly viscous lubricant, such as grease, between the inner wall sections of the shaft openings of the cartridge main body portions 51, 61 and supporting shafts of the lid members 57, 64 or between the inner surface of the shutter member 75 and the bottom surface of the slide guide recess 76. The lubricant performs the role of reducing rotational and sliding resistance between these components to suppress dust generation to capture the generated dust to prevent it from flying.

However, this lubricant is scattered to inside and outside of the cartridge main body portion to become affixed to the recording medium or the magnetic head to disable recording/reproduction of information signals. Moreover, the lubricant leaks out of the disc housing section to cause the disc-shaped recording medium to be bonded to its bottom surface to disable its rotation. In addition, the lubricant raises such a problem that the shutter member shall be bonded to the bottom surface of the slide guide recess to disable its operation. For fear of these serious problems, the conventional cartridge device for a recording medium cannot use lubricants for rotation and sliding of the lid member.

SUMMARY OF THE INVENTION

It is therefore an object of the present invention to provide a cartridge device for a recording medium in which dropout or the like is not produced on prolonged use by suppressing the effect of dust generated at the operating fulcrum point between the cartridge main body portion and the cover member to maintain high operational reliability.

In the cartridge device for a recording medium according to the present invention, the housing section for the recording medium and the cover supporting section, provided on the cartridge main body portion, are constituted by voids separated from each other by an integral partitioning wall section. The cover supporting portion of the cartridge main body portion is constituted on the inner peripheral wall section by a tubular bearing void constituted by axially contiguously formed annular projections and annular recesses. The operational fulcrum points of the cover member are constituted by a supporting shaft the outer peripheral surface of which is formed with axially contiguous annular recesses and annular projections. The bearing void and the supporting shaft are operable by constituting a bearing portion inwardly of the void having a step in an axial opening hole and which is provided by combining the annular recesses and annular projections in the axial opening hole.

With the above-described cartridge device for a recording medium according to the present invention, the housing section for the recording medium and the cover support are isolated from each other by a partitioning wall section, so that, if the cover member is in operation so that the supporting shaft and the inner wall section in the bearing void are rubbed against each other to produce dust, such dust is prevented from becoming affixed to the recording medium to prevent dropout of information signals or destruction of the magnetic head to assure reliability on prolonged use.

Moreover, in the cartridge device for a recording medium, the dust produced inside the bearing void having the step is prevented from flying to outside via an opening portion. Therefore, with the cartridge device for a recording medium, dust intrusion into the housing section for the recording medium is prevented from occurring. In addition, the recording/reproducing apparatus is protected against adverse effects otherwise caused by dust. Moreover, in the cartridge device for a recording medium, if the lubricant, such as grease, is charged in the operating fulcrum point for suppressing possible abrasion to components or suppressing dust generation, this grease may be prevented from flying to disable recording/reproduction of information signals.

In the above-described cartridge device for the recording medium according to the present invention, the operating supporting portion for the cover member adapted for opening or closing a recording/reproducing aperture by being rotatably combined with the cartridge main body portion is formed as a void isolated by a partitioning wall section formed as one with the housing section for the recording medium, so that, even on prolonged use of the device, dust or dirt produced from the cover member and the operation supporting portion is prevented from intruding into the housing section for the recording medium to become affixed to the recording medium. Thus it is possible with the cartridge device for the recording medium to suppress dropout due to dust affixed to the recording medium or to prevent destruction of the recording/reproducing means such as magnetic head to assure operational reliability on prolonged use of the device.

Moreover, in the above-described cartridge device for the recording medium, annular projections and annular recesses are provided on the operation supporting portions of the cartridge main body portion and the lid member and are engaged with one another to form a step so that rotational supporting occurs inside of the step. Thus, even if dust is produced by rubbing between the operation supporting portions and the supporting shaft, such dust is prevented from flying to outside via the operation supporting portions. The result is that the amount of dust affixed to the recording medium is significantly reduced to suppress adverse effect on the recording/reproducing apparatus.

DESCRIPTION OF PREFERRED EMBODIMENTS

Figure 1:
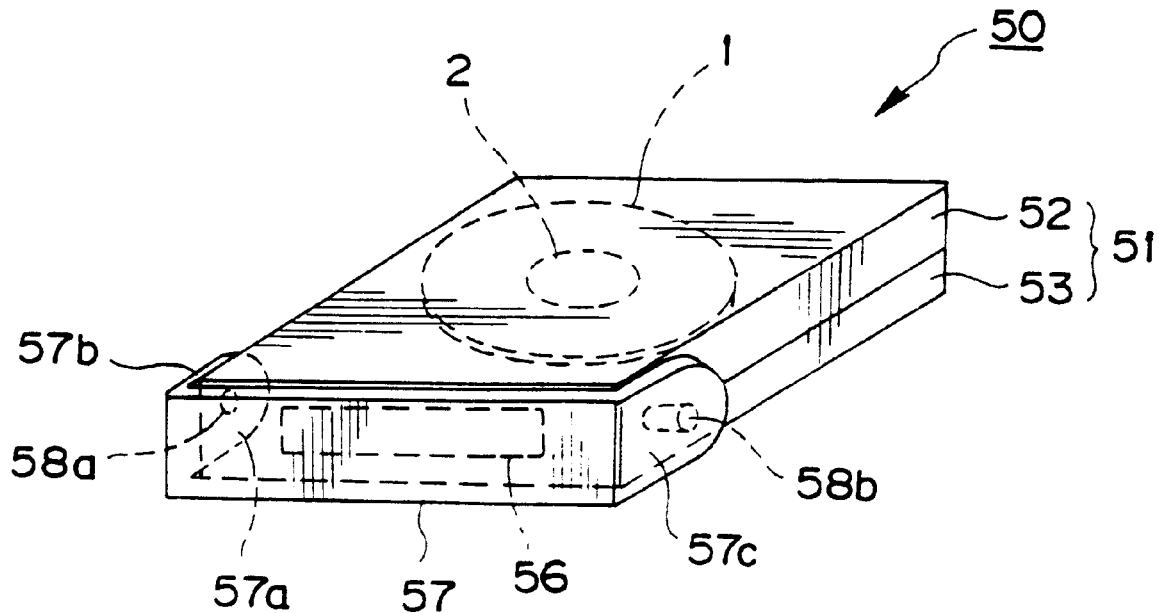
FIG. 1 is a perspective view of a conventional magnetic disc cartridge device.
Figure 2:
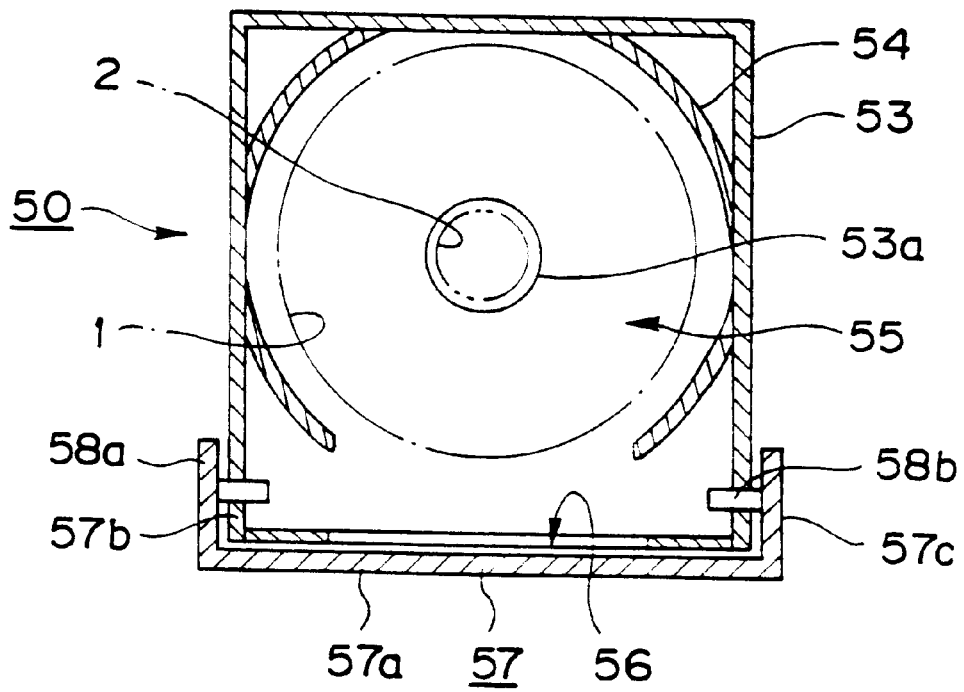
FIG. 2 is a transverse cross-sectional view of the conventional magnetic disc cartridge device from which the inner mechanism is omitted.
Figure 3:
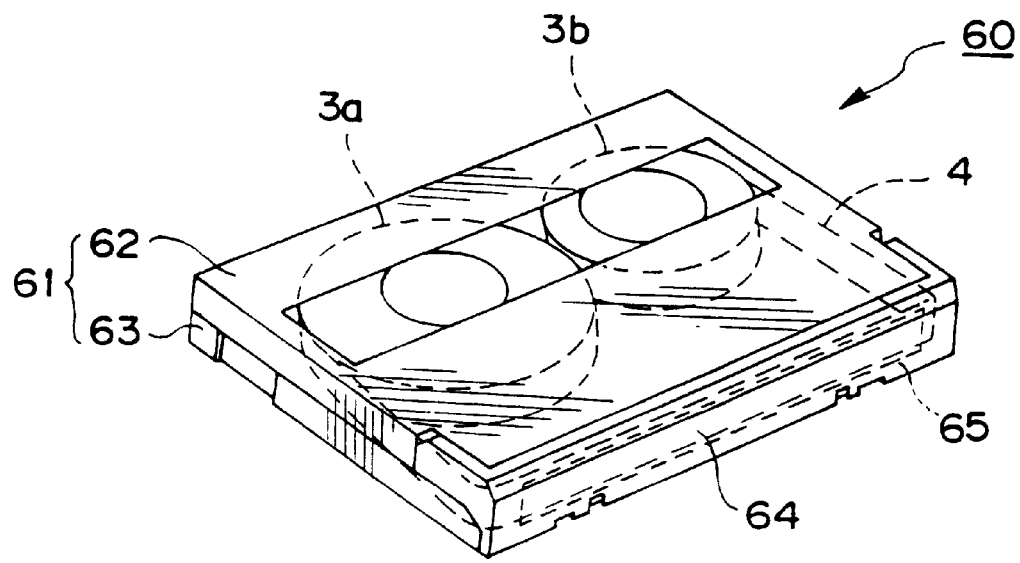
FIG. 3 is a perspective view of a conventional tape cartridge device.
Figure 4:
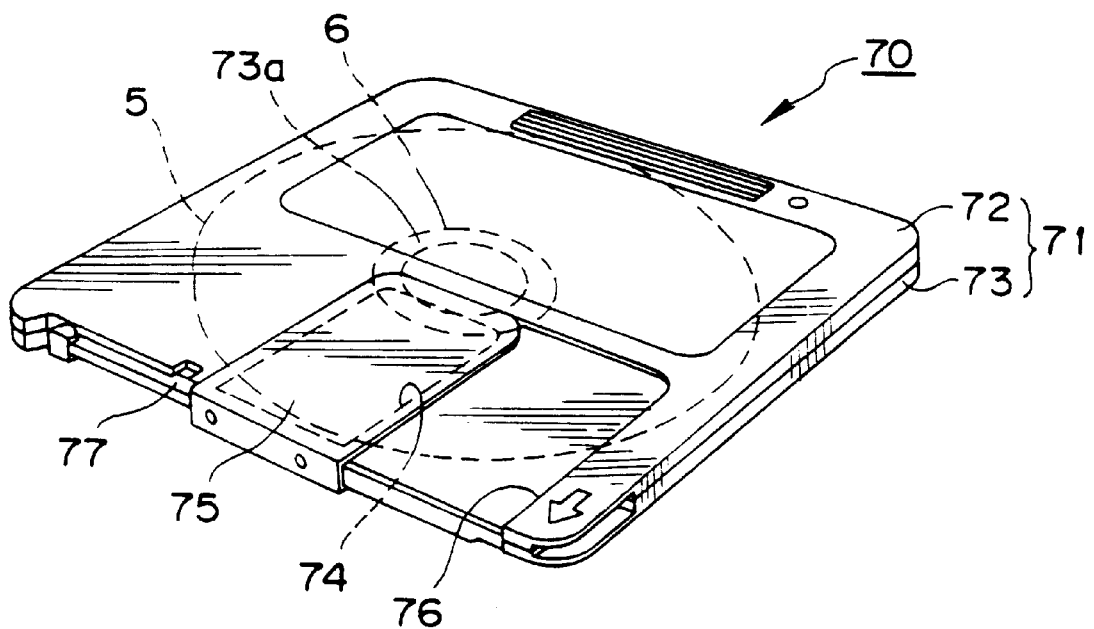
FIG. 4 is a perspective view showing the conventional disc cartridge device.
Figure 5:
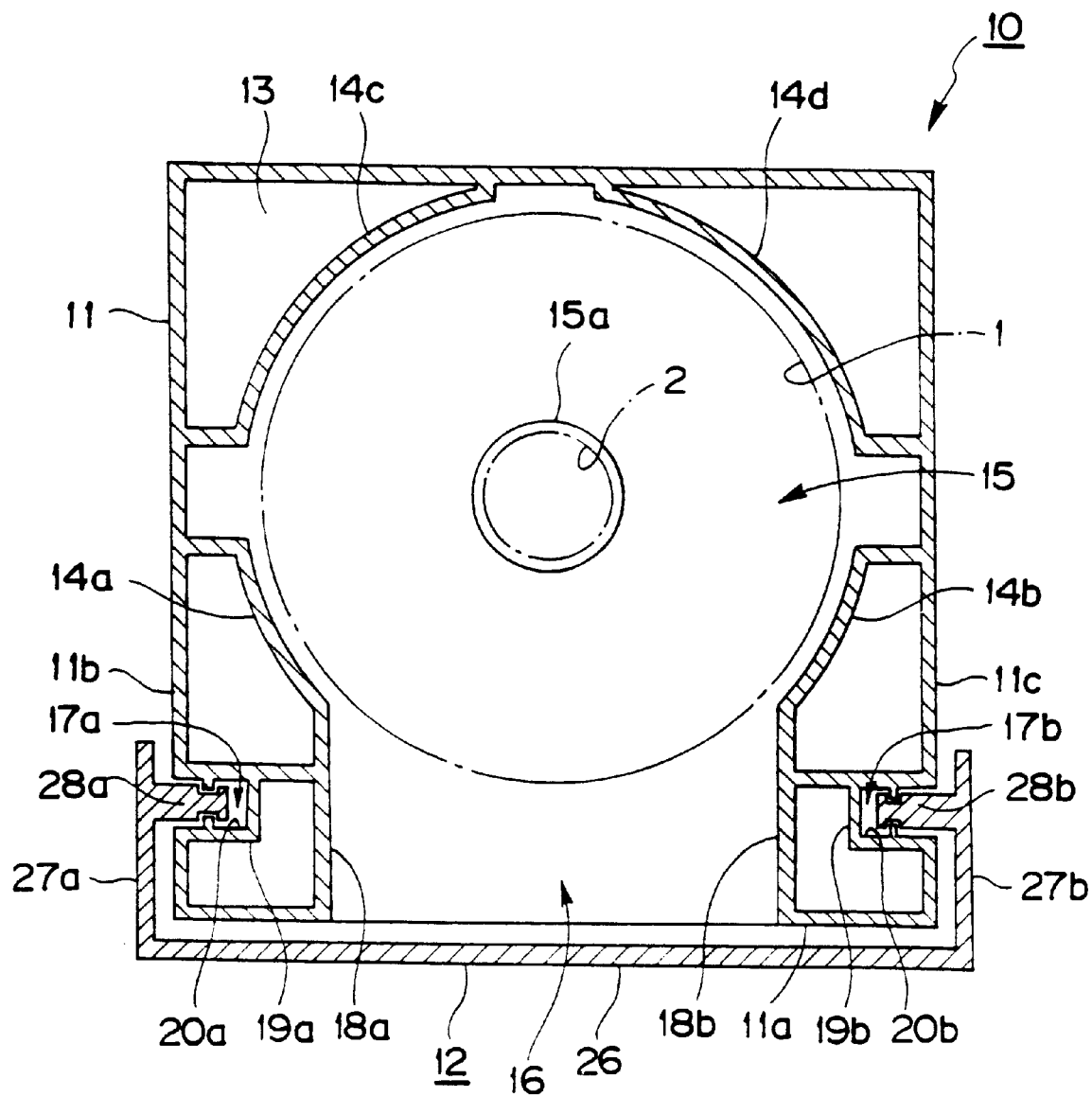
FIG. 5 is a transverse cross-sectional view of a magnetic disc cartridge device for a recording medium according to the present invention.

Referring to the drawings, preferred embodiments of the present invention will be explained in detail. A recording/ reproducing cartridge device embodying the present invention is a magnetic disc cartridge device 10, as shown in FIG. 5, used in an external storage device of a personal computer. The magnetic disc cartridge device 10 has a magnetic disc 1 rotatably housed in a cartridge main body portion 11, as later explained in detail, and a lid member 12 rotatably combined with the disc cartridge device 10. The cartridge main body portion 11 is combined from an upper half, not shown, and a lower half 13, abutted and connected to each other. The upper half and lower half 13 are formed of a synthetic resin, such as ABS resin, and are each molded to the shape of a rectangular shallow saucer.

On the facing inner surfaces of the upper half and the lower half 13 are formed upright plural arcuate-shaped disc guide wall sections 14a to 14d on the circumference of a concentric circle slightly larger than the outer diameter of the magnetic disc 1. In the assembled state of the upper half and the lower half 13, the disc guide wall sections 14a to 14d are abutted to each other to form a disc housing section 15 in which to rotatably hold the magnetic disc 1. The lower half 13 is formed with a hub opening 15a for causing the center hub 2 of the magnetic disc 1 to face the outside. In the present specification, the disc guide wall section, made up of plural parts of the same structure, are indicated initially as disc guide wall sections 14a to 14d to denote that these are plural in number and, in the subsequent description, these disc guide wall sections are collectively indicated as 14 unless the individual parts are specified.

The upper half is substantially equivalent to that of the lower half with the exception of the hub opening 15a. In the assembled state of the upper half and the lower half 13, the individual parts are paired in the up-and-down direction for defining the disc housing section 15, the recording/reproducing aperture 16 or the bearing 17 as later explained. In the following explanation, reference is had to the structure of the lower half 13 shown in FIG. 5 for explaining the entire structure of the cartridge main body portion 11. Also, in the following explanation, such terms as forward and rear, left and right and upper and lower refer to FIG. 5 and the lower, upper, forward and rear parts (relative to the drawing sheet) are denoted as 'forward', 'backward', 'upward' and 'downward', respectively.

The cartridge main body portion 11 has its forward outer peripheral wall section 11a partially removed and opened for defining a transversely elongated rectangular recording/reproducing aperture 16 into which is intruded a magnetic head on the side of the recording/reproducing apparatus. In the cartridge main body portion 11, there is integrally formed recording/reproducing aperture 16 constituting partition wall sections 18a, 18b interconnecting front ends of the disc guide wall sections 14a to 14d formed on both sides of the forward part and the forward outer peripheral wall section 11 a for constituting both lateral side wall sections of the recording/reproducing aperture 16. The disc guide wall sections 14a to 14d each delimit a void substantially shaped as a right triangle in which to form a mistaken recording inhibiting member or a design parameter detection member, not shown, at the corners of the cartridge main body portion 11, in cooperation with outer peripheral wall sections of each half.

In the cartridge main body portion 11 are formed semi-cylindrically-shaped void areas 20a, 20b opening at one ends thereof in bearing-constituting partition wall sections 19a, 19b (19) set upright integrally on both sides forwardly of the upper half and the lower half 13. In the assembled state of the upper half and the lower half 13, the semi-cylindrically-shaped void areas 20a, 20b constitute left and right paired bearing void areas 17a, 17b (17) comprised of a blind axial hole opened at one end and constituting supports for rotatably supporting the lid member 12, as will be explained subsequently.

Figure 6:
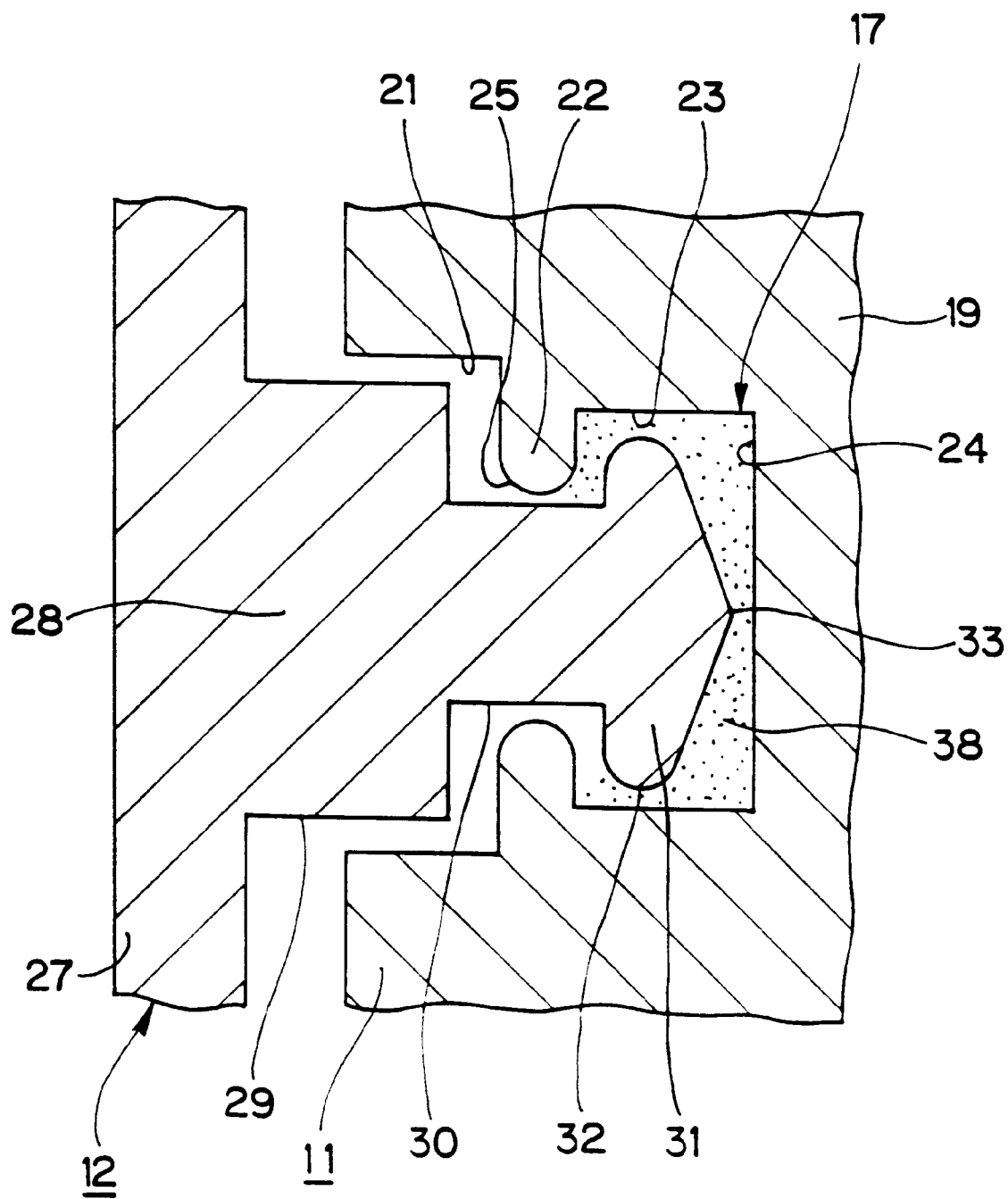
FIG. 6 is a schematic transverse cross-sectional view for illustrating the combined structure of a cartridge main body portion of the magnetic disc cartridge device with the lid member.
Figure 7:
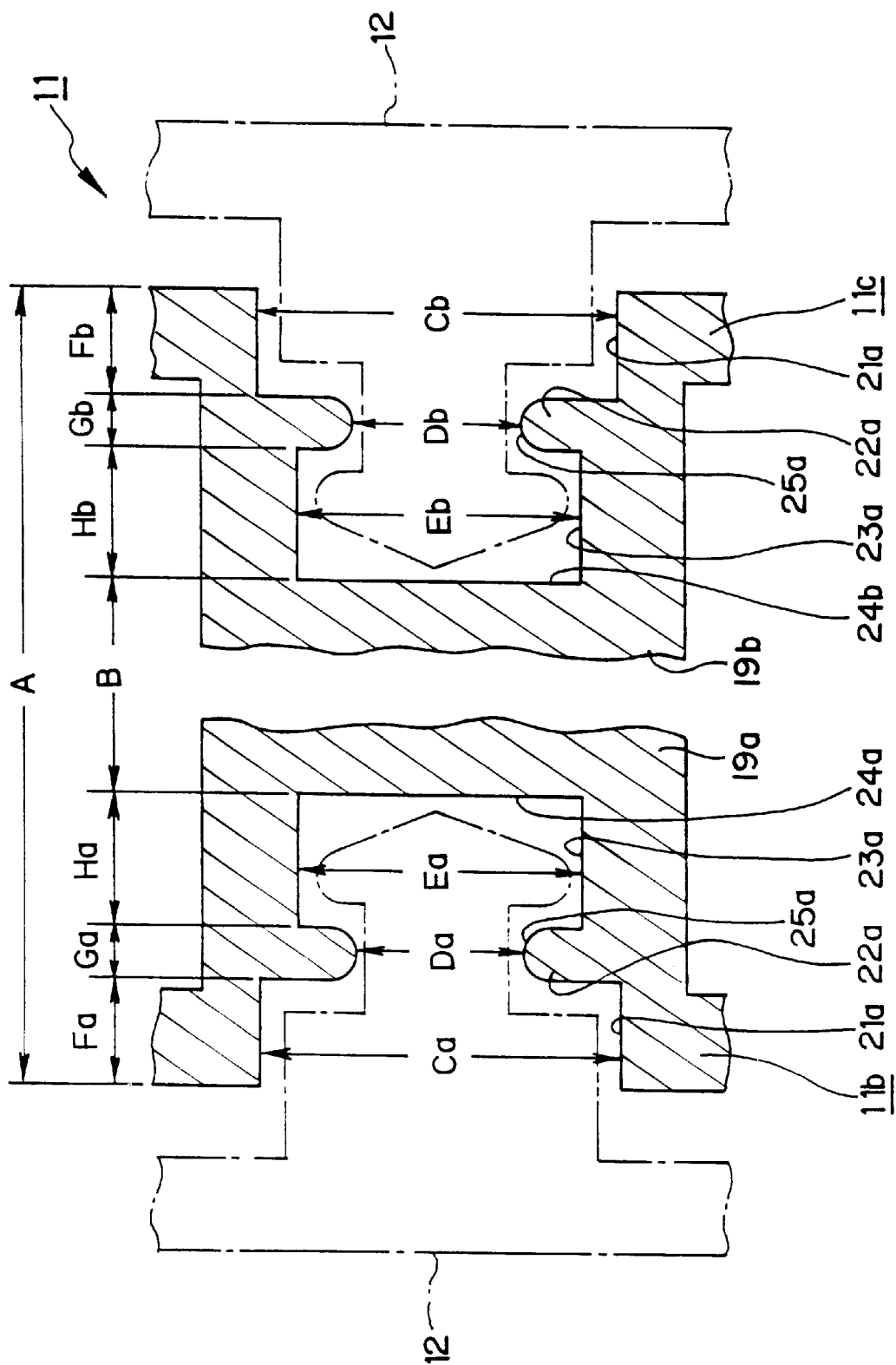
FIG. 7 illustrates the size of a lid supporting portion (bearing void) of the cartridge main body portion.

Referring to FIGS. 6 and 7, the bearing voids 17 are each formed as a blind axial hole constituted as a stepped axial opening hole which is opened in the lateral outer peripheral wall sections 11a, 11b and which has a differential inner radius in the axial direction. That is, in the bearing void 17 is formed a small-diameter axial hole by annular projections 22a, 22b (22) in an inner wall section recessed from the axial hole openings 21a, 21b (21). In the bearing void 17 are formed annular recesses 23a, 23b (23) in the recessed portion of the inner wall section in continuation to the annular projections 22. By an annular recess 24 being thus formed in the inner wall section of the bearing void 17, there is formed in the bearing void 17 a large-diameter axial hole portion in continuation to the small-diameter axial hole, with the bottom thereof presenting a large-diameter hole.

The annular projections 22 are formed so as to be arcuate in cross-section at peripheral distal ends 25a, 25b (25) as shown in these figures. In the assembled state of the lid member 12 on the cartridge main body portion 11, the peripheral distal ends 25 are rotated in frictional sliding contact with an annular recess 30 in the lid member 12. The annular projection 22, having its distal ends 25 formed to have an arcuate-shaped cross-section, reduces the frictional resistance at the time of frictional sliding rotation of the lid member 12. Of course, these annular projections 22 may have distal ends 25 thereof formed as planar surfaces.

Each portion of the cartridge main body portion 11 has its component parts sized as shown in FIG. 7. That is, the outer peripheral wall section 11b, 11c of the lateral surface have a facing interval A, while the separation between the bearing hole bottom portions 24a, 24b (24) of the bearing void 17, provided on the outer peripheral wall sections 11a, 11b of the lateral surface, is B. The inner diameters of the bearing hole openings 21 of the bearing void 17 are Ca, Cb (C), while the inner diameters of the annular projection 22 are Da, Db (D), with the inner diameters of the annular recesses 24 being Ea, Eb (E). The hole diameter C of the axial hole opening 21 of the bearing void 17 is larger than the inner diameter E of the annular recess 24 so that the bearing void 17 has a hole size of C>E>D.

The longitudinal sizes of the axial hole openings 21 of the void 17 are set to Fa, Fb (F). The longitudinal sizes of the annular projections 22 are set to Ga, Gb (G), whilst the axial longitudinal sizes of the annular recesses 23 are set to Ha, Hb (H). Although the relation of H>F>G is set in the present embodiment, the present invention is not limited to this structure.

As will become clear from the following explanation, the bearing void 17 can maintain its action of dust generation suppression even if the inner diameter E is set to be equal to or smaller than the inner diameter C of the axial hole opening 21. Therefore, it is sufficient if the bearing void 17 is constructed so that the opening diameter C of the axial hole opening 21, the inner diameter D of the annular projections 22 and the inner diameter E of the annular recess 24 satisfy the relation C>D and E>D.

The lid member 12 is formed of a synthetic resin material. The lid member 12 is formed as a substantially rectangular form by having a horizontally elongated major surface section 26 of a width slightly larger than the outer size forward outer peripheral wall section 11a of the cartridge main body portion 11 and lateral surface sections 27a, 27b

Figure 8:
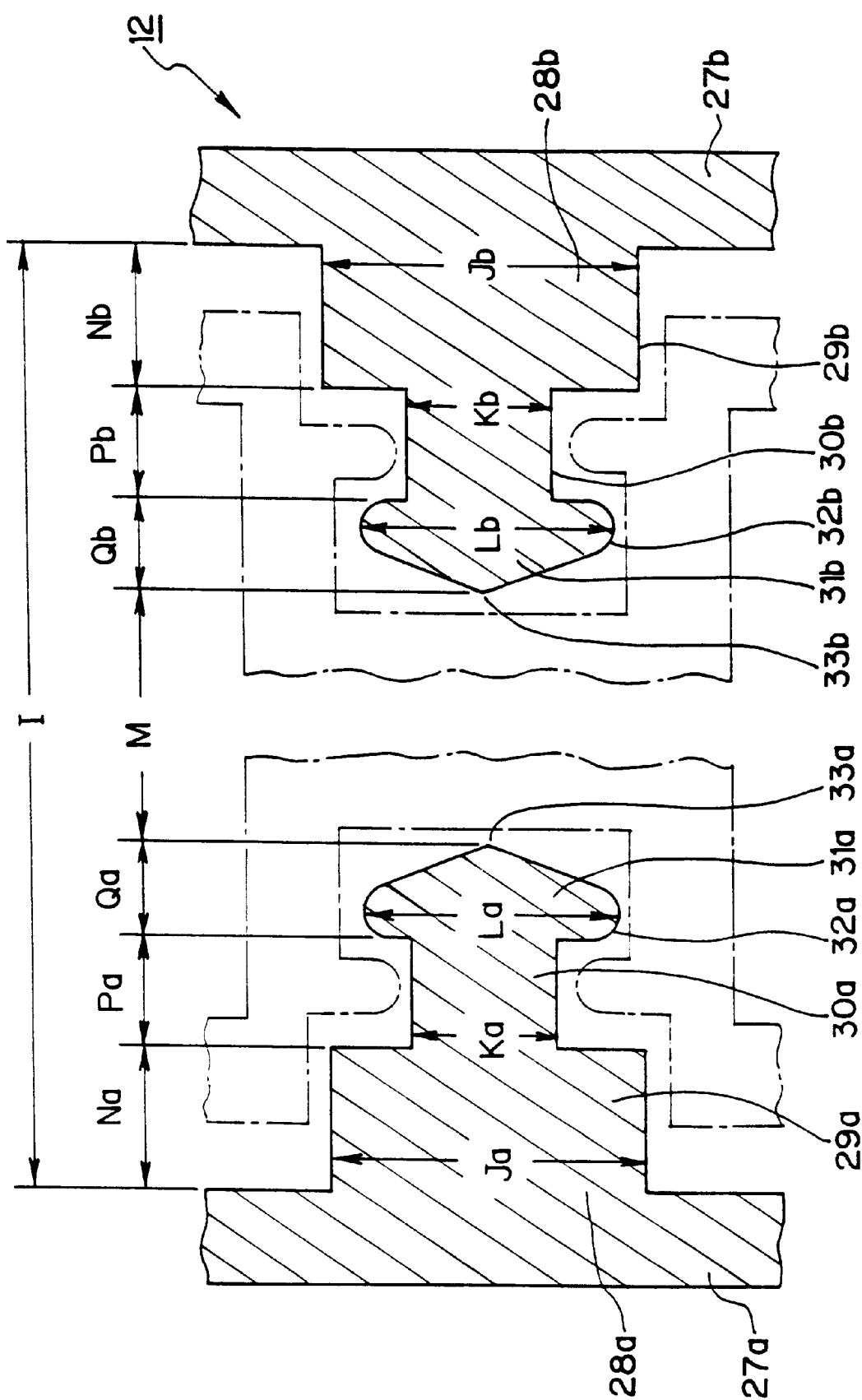
FIG. 8 illustrates the size of an operational fulcrum point (supporting shaft) of the lid member.

(27) extending for facing parallel to each other so as to be integrally formed with both lateral sides of the major surface section 26 at right angles therewith, as shown in FIGS. 6 and 8. The facing distance I of the lateral surfaces 27 of the lid 12 to the cartridge main body portion 11 is set so as to be larger than the facing separation A between the outer peripheral wall sections 11b, 11c of the cartridge main body portion 11, that is so that I>A. Therefore, in the assembled state of the lid member 12 to the cartridge main body portion 11, the lateral surfaces 27 face the outer peripheral wall section 11b, 11c of the lateral surfaces.

On the inner surfaces of the lateral surfaces 27 corresponding to the bearing void 17 of the cartridge main body portion 11 are protuberantly formed supporting shafts 28a, 28b (28) so that the supporting shafts 28a, 28b (28) constituting the operating pivot points will be located on the same axial line. The supporting shafts 28 serve as rotation pivot point for the lid member 12 by being engaged with the bearing void 17. On the outer periphery of the proximal portions 29a, 29b (29) of the supporting shafts 28 are continuously formed annular recesses 30a, 30b (30) in register with the annular projections 22 of the cartridge main body portion 11 and annular projections 31a, 31b (31) in register with the annular recesses 23 for extending in the peripheral direction.

Therefore, the supporting shaft 28 is formed as a stepped shaft on the periphery of which a small-diameter shaft portion and a large-diameter shaft portion are formed continuously by an annular recess 30 and an annular projection 31, respectively. The annular recess 30 has its axial longitudinal size P slightly smaller than the axial longitudinal size G of the annular projections 22 of the cartridge main body portion 11, as will be explained subsequently. The annular projection 31 has the axial longitudinal size Q slightly smaller than the longitudinal size H of the annular recess 23 of the cartridge main body portion 11.

The annular projection 31 has its peripheral distal end 32a, 32b (32) formed arcuately in the cross-section, as shown in FIG. 6. In the assembled state of the lid 12 on the cartridge main body portion 11, the distal end 32 of the annular projection 31 is rotated in frictional sliding contact with the annular recesses 23 of the cartridge main body portion 11. The annular projection 31, the distal end of which is arcuately formed in cross-section, reduces the frictional resistance at the time of sliding frictional rotation of the lid member 12. Of course, the annular projection 31 may have its distal end 32 formed as a planar surface.

The supporting shaft 28 is constructed as a pivot shaft by having the peripheral axial distal ends 33a, 33b (33) formed arcuately in cross-section. There are occasions wherein, when the lid member 12 is assembled on the cartridge main body portion 11, the lid member 12 is abutted against the bottom 24 of the axial hole of the bearing void 17 and thereby rotated in frictional sliding contact therewith, as will be explained subsequently. By the distal end 33 of the annular projection 31 formed substantially conically in cross-section, it is reduced in frictional resistance during rotation, while allowing the lid member 12 to be rotated in stability. Of course, the annular projection 31 may be formed as a planar surface.

The above-described lid member 12 has its various parts sized as shown in FIG. 8. The facing separation I between the lateral surfaces 27a, 27b is related with the facing separation A between the outer peripheral wall sections of the cartridge main body portion 11 by I>A. The proximal portions 29 of the supporting shafts 28 provided on the lateral surfaces 27 are Ja, Jb (J). The axial facing separation between the distal ends 33a, 33b of the annular projection 31 of the supporting shafts 28 is M, while the axial longitudinal sizes of the proximal ends 29 are Na, Nb, the axial longitudinal sizes of the annular recesses 30 are Pa, Pb (P) and the axial longitudinal sizes of the annular projections 31 are Qa, Qb (Q).

The proximal end of the supporting shafts 28 has an outer diameter J larger than the outer diameter L of the annular projection 31. Therefore, the relation of the hole diameter sizes of the supporting shafts 28 is J>L>K. Of course, if the hole diameter C, inner diameter D of the annular projections 22 and the inner diameter E of the annular recess 24 of the bearing 17 satisfy the relation C>D and E>D, the size relation of J>K and L>K is met. On the other hand, the supporting shafts 28 are arranged so that the axial longitudinal sizes of various portions meet the requirement of N>P>Q.

On the other hand, since the lid member 12 is rotatably supported by the cartridge main body portion 11, the supporting shafts 28 are designed so that the sizes of the various portions of the bearing 17 meet the following size relation: J<C, K<D and L<E wherein C, D and E stand for the inner diameter of the axial hole opening 21 of the bearing void 17, inner diameter D of the annular projection 22 and the inner diameter E of the annular recesses 23.

Moreover, the axial longitudinal sizes of various portions of the supporting shafts 28 are designed with respect to the longitudinal sizes of the various portions of the bearing void 17 so that the following size conditions: N>F, P>G and Q>H are met, wherein N, P, Q, F, G and H are the longitudinal size of the proximal portion 29, longitudinal size of the annular recess 30, longitudinal size of the annular projection 31, longitudinal size of the axial hole opening 21 of the bearing void 17, longitudinal size of the annular projection 22 and the longitudinal size of the annular recess 23, respectively.

Therefore, the cartridge main body portion 11 and the lid member 12 are arranged so that the inner diameters and outer diameters meet the following dimensional conditions: E–L<C–J and C–J>K–D.

The above-described lid member 12 is assembled to the cartridge main body portion 11 by fitting the lateral surface section 27 from the front surface of the lower half 13 to the outer peripheral wall section 1 1a, 1 1b of the peripheral surfaces for engaging the supporting shafts 28 with the void areas 20a, 20b. The supporting shafts 28 are assembled to the bearing void 17 constituted by the void areas 20a, 20b so that the proximal portion 29, annular recess 30 and the annular projection 31 will be engaged with the axial hole opening 21, annular projection 22 and with the annular recesses 23, respectively.

The torsion spring is then assembled on the lower half 13 and 2, subsequently on the upper half. Of course, in the lower half 13, the magnetic disc 1 is loaded on the disc housing 15, while the mistaken recording inhibiting member and the design parameter detection member, not shown, are assembled to corners between the outer peripheral wall section and the disc guide wall sections 14a to 14d. After various components parts are assembled in position, the upper half and the lower half 13 are welded at the junction portions by, for example, ultrasonic welding, for completing the magnetic disc cartridge device 10.

Figure 9:
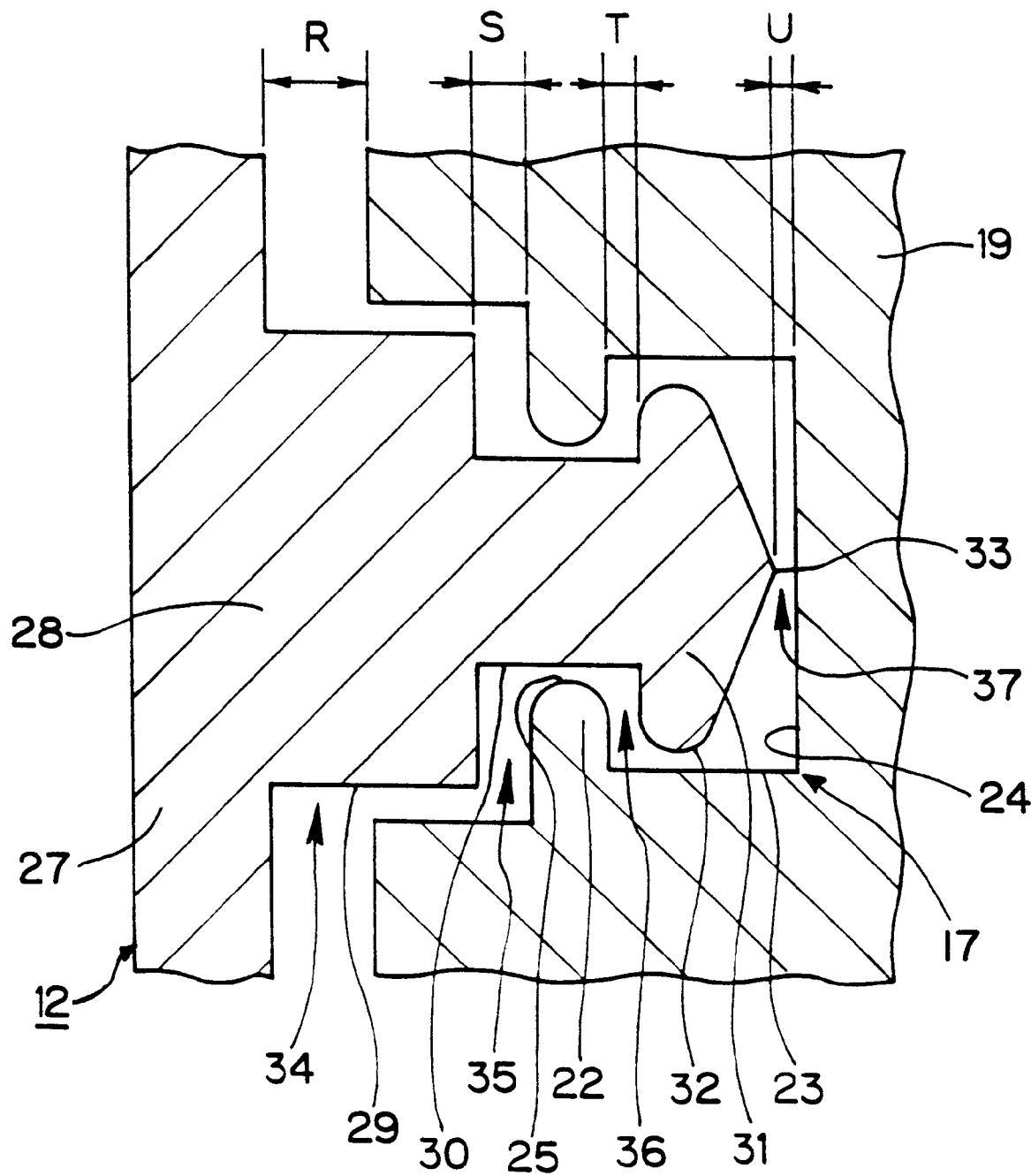
FIG. 9 is a schematic transverse cross-sectional view for illustrating the gap formed in various portions in the assembled state of the cartridge main body portion and the lid member.
Figure 10:
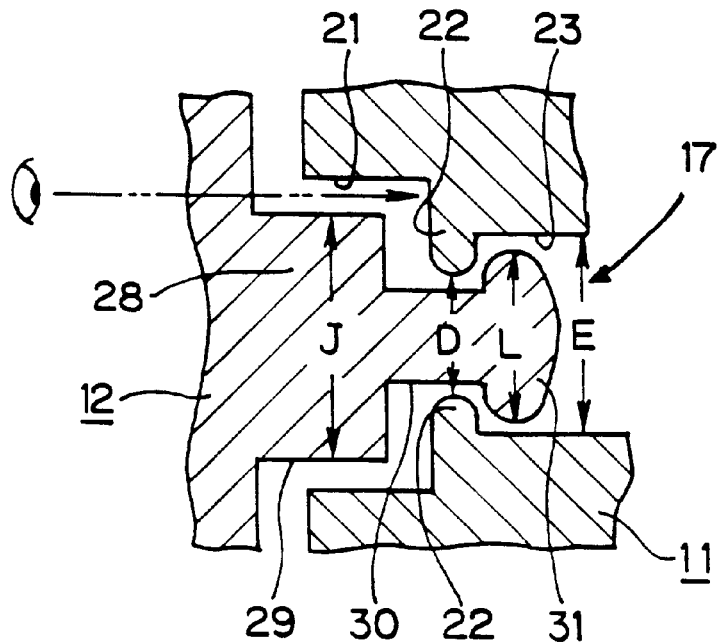
FIG. 10 illustrates a structure in which the supporting portion is not directly seen from outside.

Due to the above-described structure of the various components of the cartridge main body portion 11 and the lid member 12 of the magnetic disc cartridge device 10, axial first gaps 34a, 34b (34) to fourth gaps 37a, 37b (37) are constituted between corresponding component parts, as shown in FIG. 9. Of course, in the cartridge main body portion 11 and the lid member 12, the facing separation I of the outer peripheral wall section 11a, 11b of the lateral surfaces and the facing separation A between lateral surfaces 27 are related to each other by I>A, as described above, the left-to-right gaps of the first to fourth gaps 34 to 37 are not equal to one another. However, the first to fourth gaps 34 to 37 are constant when taken in their entirety.

With the cartridge main body portion 11 and the lid member 12, the first gaps 34 are constituted between the outer peripheral wall section 11a, 11b of the lateral surfaces and the inner lateral sides of the lateral surfaces. The gap values of the first gaps 34 are Ra, Rb (R). With the cartridge main body portion 11 and the lid member 12, the second gaps 35 are delimited between the outer peripheral sides of the annular projection 22 of the bearing void 17 and the step between the proximal portion 29 of the supporting shaft 28 and the annular recess 30. The gap values of the second gaps 35 are Sa, Sb (S).

The third gaps 36 are constituted between the inner peripheral lateral sides of the annular projection 22 of the bearing void 17 and the step between the annular recess 30 of the supporting shaft 28 and the annular projection 31. The gap values of the third gaps 36 are Ta, Tb (T). The fourth gaps 37 are formed between the bottom surface 24 of the annular recess 23 of the bearing 17 and the distal end 33 of the annular projection 31. The gap amounts of the fourth gap 37 are Ua, Ub (U).

The various parts of the cartridge main body portion 11 and the lid member 12 are constituted so that, for the gap amounts of the first to fourth gaps 34 to 37, the combinational conditional expressions:

$I-A=Ra+Rb=R$ $M-B=Ua+Ub=U$ $Ta+Tb<Ra, Ta+Tb<Rb$ $Ua+Ub<Ra, Ua+Ub<Rb$ $Ta+Tb<Sa, Ta+Tb<Sb,$ $Ua+Ub<Sa, Ua+Ub<Sb$ are met.

Since the annular projections 31 of the supporting shafts 28 are engaged with the annular recess 23 of the bearing void 17 as described above, the outer peripheral lateral surface of the annular projection 31 is retained by the inner peripheral lateral surface of the annular recess 23 for inhibiting extraction thereof from the cartridge main body portion 11. The supporting shafts 28 are carried and supported between the outer peripheral surface of the facing annular recesses 30, annular distal ends 25 of the annular projection 22 and the distal end 32 of the annular projection 31 and the inner peripheral surface of the annular recess 23. The supporting shafts 28 are smoothly rotated in the bearing space 17 because the frictional resistance on initial rotation is decreased by arcuately forming the distal end 25 of the annular projection 22 and the distal portion 32 of the annular projection 31.

Figure 15:
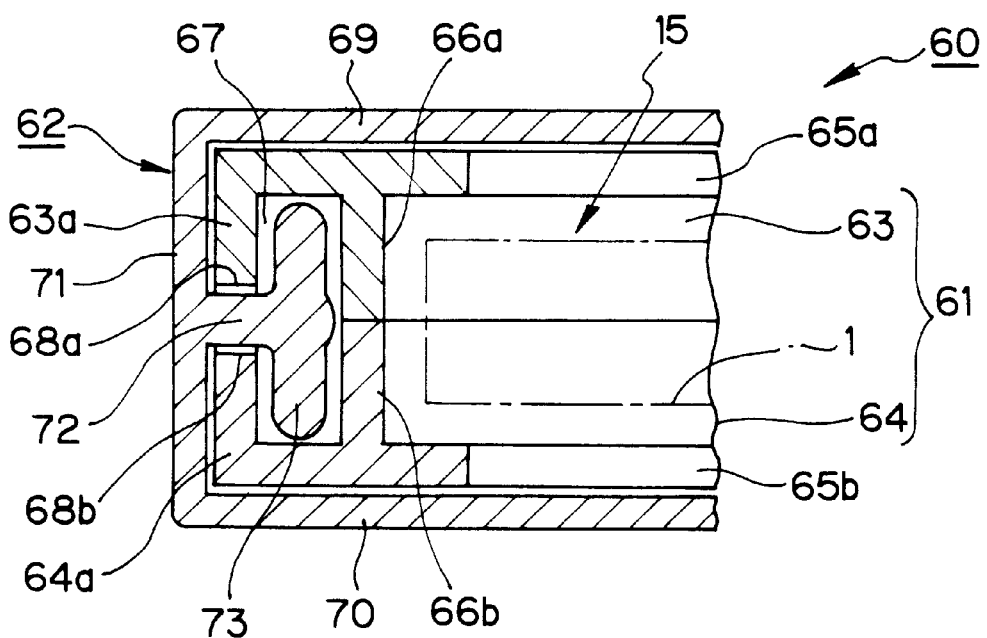
FIG. 15 is a schematic longitudinal cross-sectional view of the disc cartridge device.

In the assembled state of the lid member 12 to the cartridge main body portion 11, the lid member 12 is kept in the state of closing the recording/reproducing aperture 16 as shown in FIG. 15. When the magnetic disc cartridge device 10 is loaded in position on the recording/reproducing apparatus, the lid member 12 is rotated against the force of a torsion spring by an opening member for opening the recording/reproducing aperture 16. Meanwhile, the lid member 12 may be configured for holding the recording/reproducing aperture 16 in the closed state by a mechanical lock unit in place of by a torsion spiring.

Into the magnetic disc cartridge device 10 is intruded a magnetic head device on the side of the recording/reproducing apparatus via the opened recording/reproducing aperture 16 so as to face the major surface of the magnetic disc 1 held in the loaded magnetic head. The magnetic head device of the magnetic disc cartridge device 10 records and/or reproduces information signals recorded by the magnetic head device on the magnetic disc 1.

Meanwhile, in the magnetic disc cartridge device 10, the bearing void 17 of the cartridge main body portion 11 has the annular projections 22 and the annular recesses 23 in continuation in the axial hole for providing axial different hole diameters. Moreover, the supporting shafts 28 of the lid member 12 are provided with the annular recess 30 and the annular projection 31 in continuation with each other on its outer periphery for providing different axial outer diameters. Stated differently, in the magnetic disc cartridge device 10, the bearing void 17 of the cartridge main body portion 11 and the supporting shafts 28 of the lid member 12 are combined together by a so-called labyrinth structure.

Meanwhile, the various parts of the bearing void 17 and the supporting shafts 28 satisfy the above conditional expressions and, for J>K, also satisfy the dimensional conditional expression:

$J>D+(E-L)$ is also met.

Thus, in the magnetic disc cartridge device 10, the bearing gap between the bearing void 17 and the supporting shaft 28, that is the gap between the annular projection 22 and the annular recess 30, and the gap between the annular recess 23 and the annular projection 3 1, cannot be seen directly from the gap between the axial hole opening 21 and the proximal end 29.

Therefore, in the magnetic disc cartridge device 10, since the bearing portions between the bearing void 17 and the supporting shafts 28 of the lid member 12 are combined together by a labyrinth structure, it becomes possible to suppress the phenomenon of the flying dust produced on rubbing between various components of the bearing void 17 and various components of the supporting shafts 28 on rotation of the lid member 12. That is, since the magnetic disc cartridge device 10 is designed for bearing the supporting shafts 28 in the inside of the bearing void 17, dust is generated in the inside of the device 10. Also, in the magnetic disc cartridge device 10, since the supporting shafts 28 and the bearing void 17 are combined by the labyrinth structure, the dust generated in the inside is less liable to be discharged to outside via the axial hole openings 21.

On the other hand, the void areas 20 constituting the bearing void 17 rotatably supporting the supporting shafts 28 of the lid member 12 are isolated from the disc housing 15. Thus, with the magnetic disc cartridge device 10, if dust is generated on rotation of the lid member 12, the dust is prevented from flying to outside by the labyrinth structure. Moreover, by the partitioning structure of the disc housing 15 and the bearing space 17, the phenomenon in which the dust become affixed to the magnetic disc 1 housed in the disc housing 15 can be reduced significantly.

This suppresses occurrences of serious accidents, such as dropout or magnetic head destruction in the magnetic disc cartridge device 10, thus assuring reliability on prolonged use of the device. Moreover, with the magnetic disc cartridge device 10, the magnetic head or other parts of the recording/reproducing apparatus by the flying dust can be prevented from being affected by the flying dust.

In the magnetic disc cartridge device 10, grease or the like highly viscous lubricant 38 may be used for providing lubricating properties between the bearing void 17 of the cartridge main body portion 11 and the supporting shafts 28 of the lid member 28. That is, in the magnetic disc cartridge device 10, the bearing void 17 and the supporting shafts 28 are combined together by a labyrinth structure. The bearing void 17 and the supporting shafts 28 are formed as a so-called dovetail void in which the opening area of the engagement void between the annular recesses 23 and the annular projections 31 is sandwiched by an annular projection 22.

In the magnetic disc cartridge device 10, a lubricant 38 is charged in the engagement void between the annular projection 31 and the annular recesses 23, as shown in FIG. 6. Therefore, by the entire labyrinth structure and the structure of the engagement void, the lubricant 38 dwells in the inside of the bearing void 17 while there is substantially no risk of the lubricant leaking out via the axial hole opening 21 to outside.

In the above-described magnetic disc cartridge device 10, the annular projections 22 and the annular recesses 23 are provided towards the bearing void 17, while the annular recess 30 and the annular projection 31 are provided towards the supporting shafts 28 for providing a labyrinth structure having a sole step difference in the axial direction. However, the above structure may be arranged as a labyrinth structure comprised of multi-stage step differences. This structure can further improve the effect of holding the lubricant 38 in the axial hole to prevent the lubricant from flying to outside.

The present invention is not limited to the above-described magnetic disc cartridge device 10, since an arrangement as now explained can be used as for the supporting structure supporting the bearing void 17 of the cartridge main body portion 11 and the supporting shafts 28 of the lid member 12. In the following description, the structure having substantially the same structure as the above-described parts are denoted by the same reference numerals and detailed description is omitted for clarity.

Figure 11:
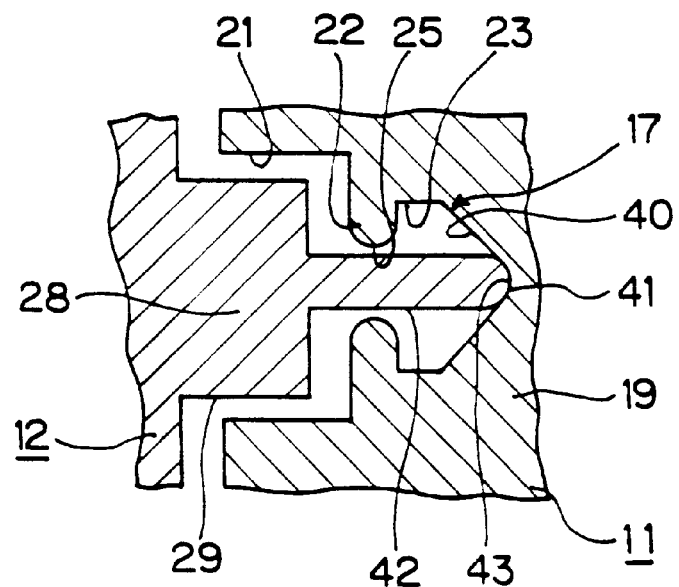
FIG. 11 is a schematic transverse cross-sectional view showing a modification of the bearing portion.

In the supporting structure, shown for example in FIG. 11, a pivot bearing 41 is integrally formed at an axial center on the bottom surface 40 of the annular recesses 23 of the bearing void 17 provided in the cartridge main body portion 11. Thus, the bearing void 17 is formed by a substantially conically-shaped recess in the bottom surface 40 of the annular recesses 23. The supporting shafts 28 of the lid member 12 are integrally formed with a reduced-diameter shaft portion 42 at the distal end of the proximal portion 29, as shown in FIG. 11. The shaft portion 42 is not formed on its outer periphery with a radial step difference. The outer diameter of the shaft 42 of the supporting shafts 28 is slightly smaller than the inner diameter of the annular projections 22 of the bearing void 17, while the distal end 43 of the shaft 42 is arcuately-shaped to form a pivot. Of course, in this supporting structure, the bearing void 17 is constructed as a void isolated from the disc housing section 15 by the bearing constituting partition wall section 19.

In the above structure, in the assembled state of the lid member 12 to the cartridge main body portion 11, the outer periphery of the shaft portion 42 of the supporting shafts 28 are supported by the distal ends 25 of the annular projections 22 towards the bearing void 17 with the distal end 43 of the pivot compressing against a pivot bearing 41 on the bottom surface 40. The supporting shafts 28 are supported in this manner at the outer periphery of the bearing 42 and at the distal end of the pivot 43 by the pivot bearing 41 so as to be rotatably supported by the bearing void 17 thus enabling the lid member 12 to be rotatably combined with the cartridge main body portion 11.

In the supporting structure, shown in FIG. 11, the supporting shafts 28 are supported by the distal end 43 of the pivot and the pivot bearing 41 for enabling rotation of the lid member 12 in a more stable state. Moreover, the amount of dust generated on rotation of the lid member 12 is smaller. In this supporting structure, the supporting portions of the supporting shafts 28 are inside the annular projections 22 of the bearing void 17, while a labyrinth structure is constructed between the axial hole opening 21, proximal portion 28, annular projection 22 and the shaft 42, so that there is no risk of dust generated on rotation of the lid member 12 from flying to outside via the axial hole openings 21.

Figure 12:
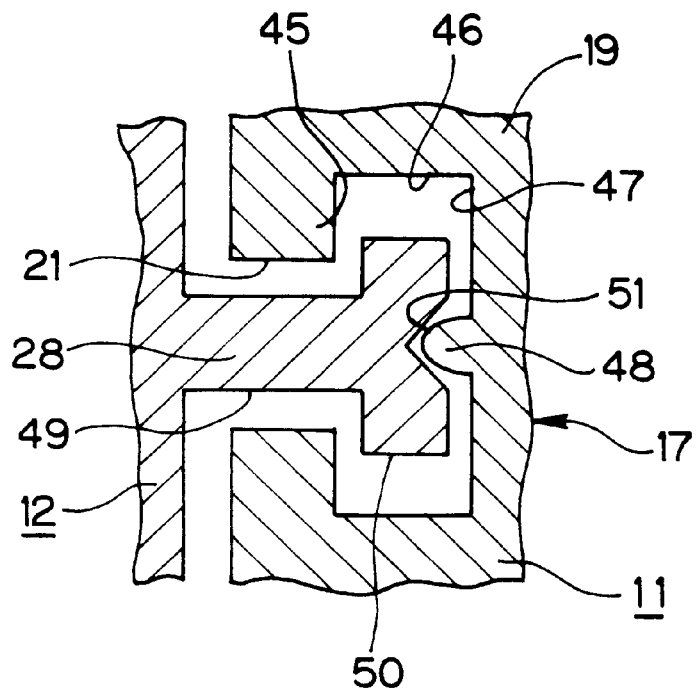
FIG. 12 is a schematic transverse cross-sectional view showing another modification of the bearing portion.

In the supporting structure shown in FIG. 12, the bearing void 17 of the cartridge main body portion 11 forms an annular projection 45 by reducing the diameter of the axial hole openings 21. In continuation to this annular projection 45 is provided an annular recess 46 providing a large-diameter void. In this annular recess 46 is formed a pivot 48 of a hemi-spherical cross-section at the axial center of a bottom surface section 47 of the annular recess 46. Thus, the bearing void 17 in its entirety has substantially the shape of a dovetail groove. Of course, the bearing void 17 is constituted by the bearing constituting partition wall section 19 as a spacing isolated from the disc housing section 15, not shown.

On the other hand, from the lateral surface of each of the supporting shafts 28 of the lid member 12 is integrally set upright a small-diameter shaft 49 the distal end of which is formed with an annular boss 50 engaged in the annular recess 46. At the axial center of the end face of the annular boss 50 is formed a pivot bearing 51. The outer diameter of the shaft 49 of the supporting shafts 28 is slightly smaller than the inner diameter of the annular projection 45, with the outer diameter of the annular boss 50 being smaller than the inner diameter of the annular recess 46.

In the above-described supporting structure, the pivot 48 is engaged with the pivot bearing 51 of the supporting shaft 28 for permitting the lid member 12 to be rotated in a more stable state relative to the cartridge main body portion 11. Also, in this supporting structure, the amount of dust generated on rotation of the lid member 12 is reduced. Moreover, in this supporting structure, since the supporting site of the supporting shaft 28 is located inwardly of the annular projection 45 of the bearing void 17, and the a labyrinth structure is constituted from the axial hole openings 21 via shaft 49 and annular recess 46 to the annular boss 50, it becomes possible to prevent the dust produced on rotation of the lid member 12 from flying outwards via the axial hole openings 21.

Figure 13:
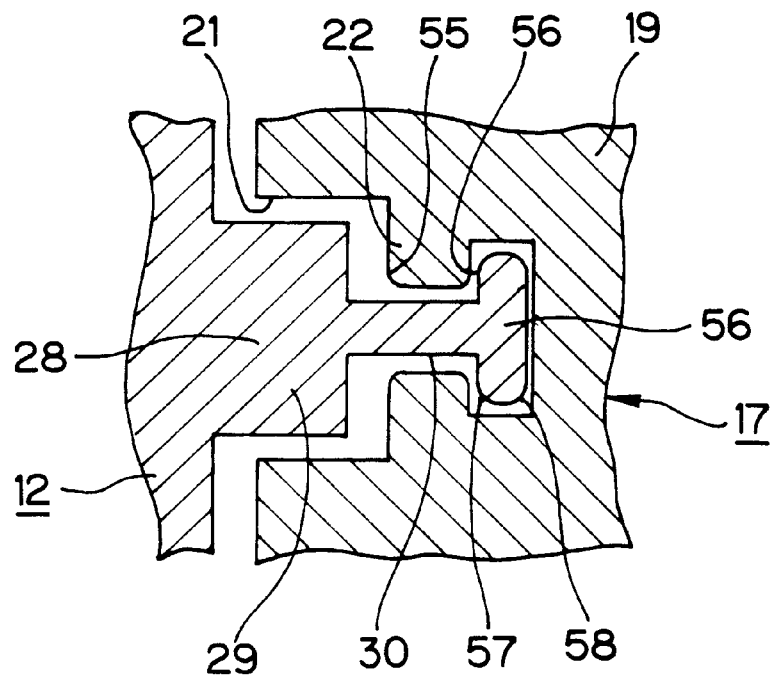
FIG. 13 is a schematic transverse cross-sectional view showing still another modification of the bearing portion.

Moreover, the supporting structure shown in FIG. 13 is basically similar to that of the above-described first embodiment, and is characterized by chamfered distal side lateral edges 55, 56 of the annular projections 22 formed in the bearing void 17 and chamfered distal end lateral edges 57, 58 of the annular projections 31 of the supporting shafts 28 engaged in the annular recesses 23 formed in continuation to the annular projections 22. When the lid member 12 is rotated relative to the cartridge main body portion 11, these annular projections 22, 31 constitute a sliding portion for the bearing void 17 and the supporting shafts 28 between the facing annular recesses 23 and 30.

In the present supporting structure, since the distal side lateral edges 55, 56 of the annular projections 22 and the distal end lateral edges 57, 58 of the annular projections 31 are chamfered as described above, the supporting shafts 28 can be rotated smoothly without becoming caught in the bearing void 17. The result is that the supporting structure permits the lid member 12 to be rotated in a more stable state relative to the cartridge main body portion 11.

In the above-described embodiments, the description has been made of a magnetic disc cartridge device 10 holding the magnetic disc 1. However, the present invention is also applicable to a disc cartridge device holding a magneto-optical disc or a floppy disc as a disc-shaped recording medium. The present invention is also applicable to a tape cartridge device holding a tape-shaped recording medium in place of the disc-shaped recording medium.

Figure 14:
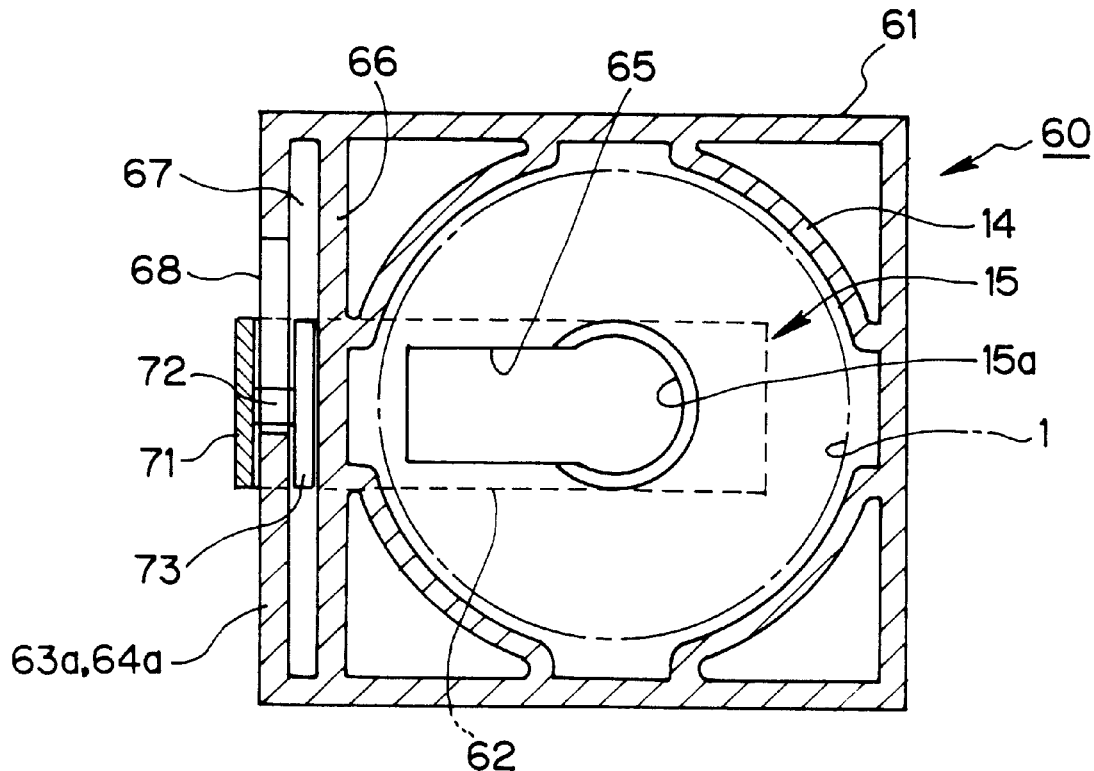
FIG. 14 is a schematic transverse cross-sectional view showing a disc cartridge device as a modification of the disc cartridge device for a recording medium according to the present invention, with the internal structure not being shown.

In the above-described embodiments, the description has been made of a magnetic disc cartridge device 10 in which the U-shaped lid member 12 is rotated relative to the cartridge main body portion 11 for opening or closing the recording/reproducing aperture 16 formed in the front side of the cartridge main body portion 11. However, the present invention is also applicable to a disc cartridge device 60 having a shutter member 62 slidably assembled to the cartridge main body portion 61 as shown in FIGS. 14 and 15. In the following description, parts or components in common with those of the magnetic disc cartridge device 10 are depicted by the same reference numerals and the corresponding description is omitted for clarity. Also, the magnetic disc is a magneto-optical disc which optically reproduces information signals and also enables recording of information signals.

In the disc cartridge device 60, an upper half 63 and a lower half 64 are combined to form a cartridge main body portion 61. In the cartridge main body portion 61, the major surfaces of the upper half 63 and the lower half 64 are formed with rectangular recording/reproducing apertures 65a, 65b (65) facing each other. The cartridge main body portion 61 is provided with an upstanding peripheral wall section 63a of the upper half 63 and a similar upstanding peripheral wall section 64a of the upper half 64, abutted to each other for constituting a lateral surface, and shutter guide partition wall sections 66a, 66b (66) positioned inwardly of the upstanding peripheral wall sections 63a, 64a for facing these wall sections 63a, 64a parallel to one another.

The shutter guide partition wall sections 66a, 66b are substantially of the same height as the upstanding peripheral wall sections 63a, 64a and, in the combined state of the upper half 63 and the lower half 64, facing end faces of the shutter guide partition wall sections 66a, 66b are abutted to each other. The shutter guide partition wall sections 66a, 66b are unified together by processing the abutting end faces with ultrasonic welding. The shutter guide partition wall sections 66 delimit a shutter guide spacing 67 extending in the fore-and-aft direction between the upstanding peripheral wall sections 63a, 64a unified together.

These upstanding peripheral wall sections 63a, 64a of the upper half 63 and the lower half 64 are partially cut away for forming in a lateral surface of the cartridge main body portion 61 a shutter guide groove 68 for exposing the shutter guide spacing 67 to outside. The shutter guide groove 68 is formed in the cartridge main body portion 61 for extending through an area in which the shutter member 62 is slid to open or close the recording/reproducing aperture 65.

The shutter member 62, formed as one from, for example, a synthetic resin, includes a first shutter portion 69, a second shutter portion 70 and a connecting portion 71 interconnecting the first and second shutter portions 69 and 70. The first shutter portion 69 has an outer size sufficient to close the recording/reproducing aperture 65a on the upper half 63, while the second shutter portion 70, facing the first shutter portion 69 in parallel to each other, has an outer size sufficient to close the recording/reproducing aperture 65b on the lower half 64. The shutter member 62 also includes a connecting piece 72 on the inner surface of the connecting portion 71 and a slide portion 73 formed as-one on the distal end of the connecting piece 72. The connecting piece is protuberantly formed on the inner surface of the connecting portion 71 for extending parallel to the first and second shutter portions 69, 70.

The connecting piece 71 has a height slightly larger than the thickness of the cartridge main body portion 61. The connecting piece 72 is slightly larger than the thickness of the upstanding peripheral wall sections 63a, 64a.

Meanwhile, the shutter portions 69, 70 of the shutter member 62 are of a longitudinal size large enough to close the hub opening 15a. The distal ends of the shutter portions 69, 70 of the shutter member 62 are engaged with guide portions, not shown, formed on the major surfaces of the upper and lower halves 63, 64. Of course, the guide portions are spaced away from the recording/reproducing aperture 65.

The above-described shutter member 62 is assembled in position with the major surface of the second shutter portion 70 facing the lower half 64 and with the slide portion 73 engaged in the shutter guide spacing 67. On the lower half 64 are assembled component parts such as the mistaken recording inhibiting member or the shutter lock unit. On the lower half 64 is also assembled the upper half 63 such as to uplift the first shutter portion 69 of the shutter member 62. The upper and lower halves 63, 64 are unified together by ultrasonic welding applied to the abutting portions for constituting the cartridge main body portion 61. It is noted that the method for assembling the various components is not limited to that described above. For example, the shutter member 62 may be assembled on the upper and lower halves 63, 64 previously assembled and provisionally connected to each other.

Meanwhile, the shutter member 62 is held by a lock unit, not shown, in a state in which the recording/reproducing aperture 65 is closed by the shutter portions 69, 70. The lock unit for the shutter member 62 may, for example, be a torsion spring.

When the disc cartridge device 60 is loaded on the recording/reproducing apparatus, the lock unit is brought to an unlocking state by an opening member, not shown, to permit the shutter member 62 to be slid. By the slide portion 73 being slid in the shutter guide spacing 67, the shutter member 62 is moved from a position in which the shutter portions 69, 70 close the recording/reproducing aperture 65 to a position in which the shutter portions 69, 70 open the recording/reproducing aperture 65. Into the disc cartridge device 60 are intruded the optical pickup device and the magnetic head device of the recording/reproducing apparatus via the opened recording/reproducing aperture 65 so as to be positioned facing the major surface of the magneto-optical disc rotatably housed within the disc 1 housing unit 15. In the disc cartridge device 60, the information signals recorded on the magneto-optical disc 1 of the disc cartridge device 60 are reproduced, or the information signals are recorded on the magneto-optical disc 1, by the optical pickup device and the magnetic head device.

In the disc cartridge device 60, the shutter member 62 slid relative to the cartridge main body portion 61 as described above supports the slide portion 73 within the shutter guide spacing 67 isolated by the shutter guide partition wall sections 66 from the disc housing section 15. Thus, if the slide portion 73 is rubbed in the shutter guide spacing 67 to produce dust with the sliding movement of the shutter member 62, this dust is prevented from being intruded via the recording/reproducing aperture 65. This prevents dust from becoming affixed to the magneto-optical disc 1 of the disc cartridge device 60 to affect recording/reproducing characteristics of the recording/reproducing apparatus, thus assuring operational reliability on prolonged use.

It is noted that, if the disc 1 housed in the cartridge main body portion 61 of the disc cartridge device 60 is a replay-only optical disc, the recording/reproducing aperture 65 is formed in, for example, in the upper half 63. Therefore, with the shutter member 62, the first shutter portion 69 is sized to be large enough to close the recording/reproducing aperture 65, with the above-mentioned second shutter portion 70 being constituted as a small-sized guide portion.

What is claimed is:

1. A cartridge device for a recording medium comprising:
    a cartridge main body portion having a recording medium housing section for holding a recording medium and a recording/reproducing aperture for exposing said recording medium to outside of said cartridge main body portion to permit entrance of recording and/or reproducing means; and
    a cover member having an operational fulcrum point operably assembled in a cover member supporting portion formed in one piece with said cartridge main body portion for opening and closing said recording/reproducing aperture;
    each of said recording medium housing section and said cover member supporting portion being formed in said cartridge main body portion as hollow members isolated from each other by an integral Partition wall section, wherein
    said recording/reproducing aperture is provided on a front surface section of said cartridge main body portion;
    said cover member supporting portion is comprised of a tubular bearing space having differential axial openings being formed, on inner surfaces of both lateral surface sections perpendicular to said front surface section of said cartridge main body portion, by an annular projection and an annular recess being continuously formed on an inner peripheral wall section of said cartridge main body portion;
    said cover member having said operational fulcrum point is comprised of a supporting shaft engaged in said tubular being space, said supporting shaft including a major surface section facing said front surface section of said cartridge main body portion having said recording/reproducing aperture, lateral surface sections extending perpendicular to a major surface section for facing said both lateral surface sections of said cartridge main body portion having said cover member supporting portion and said annular recess and said annular projection formed in axial continuation to each other on said inner surfaces of said both lateral surface sections, said supporting shaft having a differential axial outer diameter relative to said annular recess and said annular projection;
    said cover member being rotatably supported relative to said cartridge main body portion at a position inside of a step formed in an axial hole by combining said annular recess and said annular projection.

2. The cartridge device for a recording medium as claimed in claim 1, wherein said cover member supporting portion is formed as a supporting hollow member having a small-sized opening;
    said cover member being operably supported relative to said cartridge main body portion by engagement in said supporting hollow member of said operational fulcrum point formed at a distal end of said cover member via a neck having a reduced size relative to said supporting hollow member.

3. The cartridge device for a recording medium as claimed in claim 1, wherein said annular projection formed in said tubular bearing space of said cartridge main body portion and on said supporting shaft of said cover member has a distal end of said annular projection formed arcuately in cross-section for achieving a frictional sliding contact with an axial bottom surface of said annular recess.

4. The cartridge device for a recording medium as claimed in claim 1, wherein a viscous lubricant is charged into said annular recess making up said step with said annular projection in said tubular bearing space provided in said cartridge main body portion.

5. The cartridge device for a recording medium as claimed in claim 1, wherein a pivot bearing for supporting said distal end of said annular projection of said supporting shaft is formed on said axial bottom surface of said annular recess in said tubular bearing space provided in said cartridge main body portion.

6. The cartridge device for a recording medium as claimed in claim 1, wherein said supporting shaft provided on said cover member is a pivot shaft having a distal end of a conically-shaped cross-section facing said axial bottom surface of said annular recess in tubular said bearing space.

7. The cartridge device for a recording medium as claimed in claim 1, wherein said cartridge main body portion and said cover member are constructed so that various parts of said supporting shaft and said tubular bearing space engaged with one another satisfy the following combination conditions:

$$I>A, M>B,$$
$$E-L<D-K,$$
$$E-L<C-J$$

wherein
    A: a first facing separation between lateral outer peripheral wall sections of said cartridge main body portion;
    B: a second facing separation of bottom surface sections of said tubular bearing space;
    C: a first inner diameter of said axial hole of said tubular bearing space;
    D: a second inner diameter of said annular projection formed in said tubular bearing space;
    E: a third inner diameter of said annular recess formed in said tubular bearing space;
    I: a third facing separation of said lateral surface sections of said cover member;
    J: a first outer diameter of a proximal portion of said cover member;
    K: a second outer diameter of said annular recess formed on said proximal portion of said cover member;
    L: a third outer diameter of said annular projection formed on said proximal portion of said cover member;
    M: a fourth facing separation of said supporting shafts.

whereby said cover member is rotated so that said lateral surface sections of said cover member are not slid on major surface section of said outer peripheral wall sections of said both lateral surface sections of said cartridge main body portion facing said lateral surface sections of said cover member.

8. The cartridge device for a recording medium as claimed in claim 7, wherein said cartridge main body portion and said cover member are constructed so that said tubular bearing space and various parts of said operational fulcrum point satisfy the following combination conditions:

$I-A=Ra+Rb, M-B=Ua+Ub,$ $Ta+Tb<Ra, Ta+Tb<Rb$ $Ta+Tb<Sa, Ta+Tb<Rb,$ $Ua+Ub<Ra, Ua+Ub<Rb$ $Ua+Ub<Sa, Ua+Ub<Sb$ where Ra, Rb: first aap distances formed between said outer peripheral wall sections of said cartridge main body portion and said lateral surface sections of said cover member;

Sa, Sb: outer second aap distances between said annular projection formed in said tubular bearing space of said cartridge main body portion and said annular recess formed in said supporting shaft of said cover member;

Ta, Tb: inner third gap distances between said annular projection formed in said tubular bearing space of said cartridge main body portion and said annular recess formed in said supporting shaft;

Ua, Ub: fourth aap distances between said bottom surface section of said tubular bearing space and said distal end of said supporting shaft;

whereby said cover member is rotated so that said lateral surface sections of said cover member are not frictionally slid on said both lateral surface sections of said cartridge main body portion facing said lateral surface sections of said cover member.

9. The cartridge device for a recording medium as claimed in claim 7, wherein said cartridge main body portion and said cover member are constructed so that said tubular bearing space and various parts of said supporting shaft satisfy the following combinational conditional expressions:

$C-J>K-D$ $J>K$ whereby a bearing disposed inwardly of a bearing space constructed within said axial hole by combining said annular recess and said annular projection creating said step not directly seen from outside of said cartridge main body portion.

* * * * *